US007820095B2

(12) United States Patent
Priegel

(10) Patent No.: US 7,820,095 B2
(45) Date of Patent: Oct. 26, 2010

(54) MATERIAL WITH ENHANCED THERMAL PROPERTIES

(75) Inventor: Jack C. Priegel, El Paso, TX (US)

(73) Assignee: Twist Engine, Inc., El Paso, TX (US)

(*) Notice: Subject to any disclaimer, the term of this patent is extended or adjusted under 35 U.S.C. 154(b) by 812 days.

(21) Appl. No.: 11/464,406

(22) Filed: Aug. 14, 2006

(65) Prior Publication Data

US 2008/0039552 A1 Feb. 14, 2008

(51) Int. Cl.
*B29C 67/06* (2006.01)
(52) U.S. Cl. .................. 264/496; 264/71; 264/121; 264/128; 264/256; 264/DIG. 31
(58) Field of Classification Search .............. 264/128, 264/239, 241, 256, 259, 628, 9, 12, 14, 42, 264/50, 70, 71, 109, 121, 125, 255, 488, 264/494, 496, DIG. 31; 425/424, 432; 501/80, 501/84; 502/9, 10; 521/56, 919; 523/218, 523/220, 440
See application file for complete search history.

(56) References Cited

U.S. PATENT DOCUMENTS

| | | | | |
|---|---|---|---|---|
| 2,932,596 | A * | 4/1960 | Rayner | 428/215 |
| 3,074,211 | A * | 1/1963 | Sacco | 451/541 |
| 3,303,245 | A * | 2/1967 | Trudeau | 264/70 |
| 4,303,730 | A | 12/1981 | Torobin | |
| 4,303,732 | A | 12/1981 | Torobin | |
| 4,332,618 | A | 6/1982 | Ballard | |
| 4,618,517 | A | 10/1986 | Simko, Jr. | |
| 4,623,390 | A | 11/1986 | Delmonico | |
| 4,867,931 | A * | 9/1989 | Cochran, Jr. | 264/9 |
| 5,225,123 | A * | 7/1993 | Torobin | 264/43 |
| 5,359,735 | A | 11/1994 | Stockwell | |
| 5,500,287 | A | 3/1996 | Henderson | |
| 5,501,871 | A | 3/1996 | Henderson | |
| 5,713,974 | A | 2/1998 | Martin et al. | |
| 6,306,465 | B1 * | 10/2001 | Bowe | 427/393.6 |
| 6,387,504 | B1 * | 5/2002 | Mushovic | 428/413 |
| 6,423,382 | B1 * | 7/2002 | Bowe et al. | 427/521 |
| 6,616,887 | B2 * | 9/2003 | Chiu et al. | 264/496 |
| 6,709,717 | B2 * | 3/2004 | Mushovic | 427/518 |
| 7,455,798 | B2 * | 11/2008 | Datta et al. | 264/43 |
| 2002/0038916 | A1 * | 4/2002 | Chiu et al. | 264/1.21 |
| 2002/0098362 | A1 * | 7/2002 | Mushovic | 428/413 |

OTHER PUBLICATIONS

Sparrow, E.M., "Characteristics of Hollow Glass Microspheres As An Insulating Material And An Opacifier," Journal of Heat Transfer, vol. 98 (2), Abstract only, May 1976 (1 page).
Trofimov, N.N., "Multifunctional Reinforcing Materials and Discrete Fillers for Composites," Russian Electrical Engineering, vol. 66, No. 1, Abstract only, 1995 (1 page).
3M Microspheres Thermal Conductivity Report, Increasing or Decreasing Thermal Conductivity, 3M, St. Paul, Minnesota, Jun. 1998 (2 pages).
Tai, W.P. et al., "Fabrication of New Porcelain Bodies in the System of Glass Microspheres-Quartz-Aluminous Cement," Journal of the Ceramic Society of Japan, vol. 107 (1), Abstract only, Jan. 1999 (1 page).
McBride, Shawn Patrick, "Processing and Characterization of a Lightweight Concrete Using Ceramic Microballoons," Dynamic Photomechanics Laboratory, University of Rhode Island, Kingston, Rhode Island (available prior to Aug. 14, 2005) (2 pages).
Allen, M.S. et al., "Advances in Microsphere Insulation Systems," 2003 Cryogenic Engineering Conference, CEC C2 C 01 (8 pages).
3M Microspheres Selection Guide, 3M, St. Paul, Minnesota, Jan. 2003 (8 pages).
Rosenbusch, Chris et al., "The Benefits of Microspheres," reprinted from the Aug. 2003 issue of Paint & Coatings Industry Magazine (2 pages).
BMK Ltd/Microspheres, High Quality of Products and Services, [online]. Retrieved from the Internet: <URL: http://microspheres.com.ua/en/micro.html>. Published as early as Dec. 1, 2004 (2 pages).
3M Gulf, Innovation, [online]. Retrieved from the Internet: <URL: http://cms.3m.com/cms/GB/en/0-214/cRk1FFQ/view.jhtml>. Published as early as Dec. 1, 2004 (1 page).
Nayak, A.L., "Heat Transfer in Microsphere Thermal Insulations," Ph.D. Thesis, University of California, Berkeley, Abstract only, 1976 [online], [retrieved on Dec. 1, 2004]. Retrieved from the Internet: <URL: http://adsabs.harvard.edu/cgi-bin/nph-bib_query?1976PhDT.......20N> (2 pages).

(Continued)

*Primary Examiner*—Eric Hug
*Assistant Examiner*—Seyed Masoud Malekzadeh
(74) *Attorney, Agent, or Firm*—Fitch, Even, Tabin & Flannery

(57) ABSTRACT

A low density component, such as hollow microspheres, dispersed in a binder to produces a material having a surface that is comfortable to the touch even after extended exposure to an energy source, such as direct sun light.

10 Claims, No Drawings

OTHER PUBLICATIONS

Potters Industries, Inc., Polymers, Construction Materials, [online]. Retrieved from the Internet: <URL: http://www.pottersbeads.com/markets/polyconst.asp>. Published as early as Mar. 10, 2004 (1 page).

Asia Pacific Microspheres, Phenoset Microspheres, [online]. Retrieved from the Internet: <URL: http://www.phenoset.com/applications.html>. Published as early as Mar. 10, 2004 (1 page).

Brewer Science, Spacer Grade Glass Microspheres, [online]. Retrieved from the Internet: <URL: http://www.brewerscience.com/smproducts/sm_microsphere.html>. Published as early as Mar. 10, 2004 (1 page).

Smith, Ray A., The Drab Stuff of Sidewalks Takes On Hues, Translucence, Intriguing Building Designers, The Wall Street Journal, Jul. 21, 2004 (1 page).

* cited by examiner

MATERIAL WITH ENHANCED THERMAL PROPERTIES

FIELD OF THE INVENTION

The invention relates to a material having enhanced surface thermal properties and, in particular, to a material that is comfortable to the touch even after being exposed to an energy source, such as direct sunlight, for an extended period of time.

BACKGROUND OF THE INVENTION

Heat flows from a warm object to a cool object by way of conduction, convection, and radiation. Conduction is transfer of heat through physical objects, such as a thermometer under your tongue. Convection is transfer of heat through a fluid, such as an ice cube cooling a glass of water. Radiation is the transfer of heat through free space, such as warming your hands by a fire. Such properties are often optimized in materials used to construct buildings and homes to make the buildings comfortable and more energy efficient.

On the other hand, these thermal properties are less often optimized in materials used to fabricate outdoor walking surfaces, such as driveways, sidewalks, patios, and the like. For example, swimming pools are typically surrounded by ceramic tiles or concrete. After exposure to direct sunlight, these surfaces can become so hot to be uncomfortable to the touch. This situation is commonly experienced by an individual who must soft step across the tile or concrete surface to move about the pool area with bare feet.

These walking surfaces are believed to be uncomfortably hot to touch because of the combination of high thermal mass, low emissivity, and low thermal conductivity. Thermal mass is the ability of a material to store heat. Emissivity is the ability of a surface to emit or give off heat. Thermal conductivity is the ability of a material to transfer energy or heat. As a result, the typical material used to surround a pool (i.e., ceramic tiles or concrete) easily store heat energy from the sun, and lack the ability to quickly radiate this stored energy every quickly, and easily transfer it to the ground underneath. As such, upon extended exposure to direct sun-light, these materials will be uncomfortably hot to the touch.

Insulating properties have been addressed by blending into materials a small quantity of hollow glass microspheres. For example, insulating paint and coatings have been prepared by blending about 6.5 percent to about 16.5 percent microspheres to form an insulating paint or an insulating thermal coating. (See, e.g., U.S. Pat. Nos. 4,623,390 and 4,332,618.) In another example, an insulating elastomeric roof coating is prepared by blending about 6.2 percent glass shells into a polymer and resin mixture. (See, e.g., U.S. Pat. No. 5,713, 974). These examples blend a small quantity of microspheres (i.e., less than about 16.5 percent) into a base material to obtain the desired insulating properties. Such low level microsphere formulations, however, do not necessarily provide a surface that is comfortable to touch after exposure to an energy source because optimization of a material's insulating characteristics is distinct from improving its surface thermal properties.

It is also known to blend higher density additives (i.e., cellulose fibers or glass fibers) and lower density additives (i.e., microballoons) into resin systems as fillers and thickeners to generally improve the strength of the resin system. Typically, these applications only include about 4 percent to about 60 percent filler if using the high density additive or about 20 percent to about 40 percent if using the low density additive.

Accordingly, there is a desire for a material that can be exposed to an energy source, such as direct sun light, and retain the ability to be comfortably touched even after extended exposure to the energy source. It also is desired for the material to have sufficient structural integrity to support waling on it and use of furniture without becoming damaged.

DETAILED DESCRIPTION OF THE PREFERRED EMBODIMENT

The material includes a sufficient amount of a low density component dispersed in a binder so that the low density component provides a surface that remains comfortable to the touch even after being exposed to an energy source. If desired, the material may be formed into convenient shapes for handling and use, such as floor tiles, patio bricks, slabs, rock shapes, and the like. Alternatively, the material also may be formed into roofing tiles, building siding materials, and any other application desiring a surface with improved thermal properties.

The low density component is preferably dispersed uniformly throughout the binder. The effective amount of the low density component is sufficient to modify the thermal and mass properties of the material as desired. When the material is used to form a predetermined shape, such as a floor tile having a thickness of about ⅜ inch, a portion of the low density component also preferably forms at least a portion of the surface of the tile. In this manner, the low density component alters the thermal properties of the tile surface such that it remains at a temperature that a bare foot or hand, for example, can comfortably touch even after extended exposure to direct sun light for about several hours. That is, the surface of the floor tile remains at 100° F. or less even upon exposure to direct sunlight for an extended period of time.

The material includes greater than about 40 percent of the low density component uniformly dispersed throughout the binder and, preferably, about 70 percent to about 80 percent of the low density component. The preferred low density component is hollow microspheres having an average diameter from about 4 microns to about 100 microns and a density of about 0.3 to about 0.5 grams per cubic centimeter. The most preferred hollow microspheres are fabricated out of glass or ceramic, have an average diameter of about 80 to about 100 microns, and have a ratio of wall thickness to sphere diameter (aspect ratio) of about 0.7. Such aspect ratio optimizes the strength and thermal characteristics of the microspheres. Examples of suitable hollow microspheres are K-series Scotchlite™ Glass Bubbles (3M Company, St. Paul, Minn.) or Q-Cell™ hollow spheres or Extendospheres™ hollow ceramic spheres (Potters Industries, Valley Forge, Pa.).

The wall thickness generally provides strength to the microspheres, and the cavity volume generally provides the improved thermal properties. Therefore, the aspect ratio can be varied to optimize both the tile's thermal characteristics and strength. For example, utilizing microspheres with a larger diameter and a thinner wall (i.e., a smaller aspect ratio) generally forms a tile with decreased thermal mass that is more comfortable to touch. On the other hand, microspheres with an increased wall thickness (i.e., a larger aspect ratio) will generally form a stronger tile. However, depending on the concentration of the microspheres, such tile with larger aspect ratio spheres may be slightly less comfortable to touch when exposed to the energy source due to the tile having a slightly higher thermal mass.

The material includes less than about 60 percent of the binder and, preferably, about 20 percent to about 30 percent of the binder, which is sufficient to bind the hollow microspheres into a solid member, such as a floor tile, that has sufficient structural integrity to support both walking and relatively heavy furniture without being broken. The preferred binder is a thermoset resin, such as two-part epoxy, that includes a base epoxy resin and a cure agent, catalyst, or hardener. The two-part epoxy preferably utilizes a relatively slow cure time, such as 20 to 30 minutes of pot life. This time enables adequate dispersion of the hollow microspheres or other low density component into the binder in a uniform manner using a low shear or a low speed mixer before the resin hardens. Fast set resins are not preferred because there is insufficient time to uniformly disperse the hollow microspheres when using low shear or low mixing speeds. The low shear mixer or low mixing speeds is preferred because high shear or fast mixing tends to rupture or break the hollow microspheres.

In a preferred two-part epoxy resin binder, the base epoxy resin includes a bisphenol-A resin, and most preferably, includes greater than about 50 percent of the bisphenol-A resin. The hardener preferably includes an aliphatic polyamine, and most preferably, includes between about 30 percent and about 50 percent of the aliphatic polyamine. With such resin and hardener system, a ratio of the base epoxy resin to harder is preferably 5:1; however, this ratio will vary depending on the particular resin system utilized to form the binder. Suitable epoxy resins and hardeners that may be used for the binder can be obtained from West Systems (Bay City, Mich.).

The ratio of binder to microspheres can also be varied to control the strength and thermal properties of the tile. For example, higher concentrations of microspheres generally provide a lower thermal mass, and increased levels of binder generally provides a stronger tile. In addition, the microspheres may also include a blend of different sizes. For instance, the low density component may include a mixture of large diameter spheres and small diameter spheres. In this manner, the smaller diameter spheres will occupy any spaces that may be formed between the larger diameter spheres. Such formation results in a more dense packing of the microspheres in the tile.

Alternatively, other ingredients may comprise the low density component and the binder. The low density component also may be any ingredient that forms hollow voids within the binder. For example, the low density component may be a foaming or frothing agent mixed with the binder in order to aerate the binder to form a predetermined volume of void space. The binder also may include other materials that are suitable to form a floor tile that has a sufficient hardness and structural integrity to walk on and that adequately binds the low density component. For example, cement, ureas, or urethanes also may be employed for the binder.

Optionally, the material also may include a dispersion aid to help uniformly disperse the low density component within the binder. In one form, the dispersion aid may be a zirconate coupling agent (e.g., Kenrich Petrochemicals, Bayonne, N.J.) in an amount less than about one percent.

The low density component, such as the hollow microspheres, alters the thermal and density properties of the material to permit the material to have a surface that remains comfortably cool to the touch even after extended exposure to an energy source, such as direct sun light. For example, the amount of the low density component lowers the material's thermal mass such that the material does not retain a sufficient amount of heat that makes it too warm to touch. The low density component also alters the material's emissivity such that the material's surface radiates any of the stored heat more quickly. In addition, the low density component alters the material's thermal conductivity such that the material more easily conducts any absorbed heat energy through and from the tile to the surface underneath. While the above theories apply to the materials described herein, they are not intended to limit the scope of the invention, and the materials described herein may exhibit such thermal properties via other mechanisms or through other thermal characteristics.

The following example is intended to illustrate, and not to limit, the scope of the invention set forth in the appended claims. All percentages used herein are by weight, unless otherwise indicated.

A floor tile was cast by blending five parts epoxy resin #105 to one part hardener #206 (West Systems, Bay City, Mich.) using a paint mixer to form a blended mixture. Ceramic microspheres having an average diameter of about 80 microns (Extendospheres, Potters Industries, Valley Forge, Pa.) were added into the blended mixture while the epoxy resin was still in a liquid state. The slurry was mixed under low shear using a bread mixer with a kneading attachment to uniformly disperse the microspheres to form a slurry. The slurry was prepared using 80 percent microspheres and 20 percent epoxy resin and hardener in the 5:1 ratio. For comparison, a control slurry of 100 percent epoxy resin (i.e., zero percent microspheres) also was prepared.

While the slurry was still in a liquid state, it was poured into round molds about 4 inches in diameter and about ⅜ inches thick. During the filling, a vibrating table was used to ensure the molds were uniformly filled and that voids or air pockets were removed and filled. The filled molds were allowed to cure for about 9 to 12 hours to form a solid floor tile.

The molded tiles were then placed in direct sunlight and the surface thermal properties were qualitatively tested by placing a bare foot on the surface at 5 minute intervals, which allowed sufficient time for the bottom of the foot to return to a neutral temperature in between evaluations. The tile with the microspheres produced a surface that was comfortable to the touch and still retained sufficient structural integrity to form a floor tile that could support walking. On the other hand, the tile with no microspheres was uncomfortable to touch with the bare foot.

It is to be understood that various changes in the details, materials, and arrangements of parts, components and mixtures which have been herein described and illustrated in order to explain the nature of the invention may be made by those skilled in the art and be within the principle and scope of the invention as expressed in the appended claims

What is claimed is:

1. A method for forming a floor tile comprising:
   mixing a hardener into a base epoxy resin to form a binder;
   blending about 40 weight percent to about 80 weight percent of a low density additive including hollow microspheres having a density of about 0.3 to about 0.5 g/cc into about 20 weight percent to less than about 60 weight percent of the binder to form a slurry;
   pouring the slurry into a mold;
   moving the mold to ensure distribution of the hollow microspheres in the slurry;
   curing the slurry to form the floor tile so that the floor tile has the hollow microspheres dispersed throughout and a portion of the hollow microspheres form a portion of an outer surface of the floor tile; and
   wherein the low density additive is effective such that the outer surface of the floor tile has a temperature of about 100° F. or less upon exposure to an energy source.

2. The method of claim 1, wherein the low density additive includes hollow microspheres having an average diameter from about 4 to about 100 microns.

3. The method of claim 2, wherein the hollow microspheres have a ratio of wall thickness to sphere diameter of about 0.7.

4. The method of claim 2, wherein the slurry contains about 70 weight percent to about 80 weight percent of the hollow microspheres.

5. The method of claim 2, wherein the base epoxy resin includes greater than about 50 weight percent of a bisphenol-A resin.

6. The method of claim 5, wherein the hardener includes about 30 weight percent to about 50 weight percent of an aliphatic polyamine.

7. The method of claim 6, wherein the mold has a predetermined thickness of about ⅜ inch thick.

8. A method for forming a tile comprising:

mixing a hardener into a base epoxy resin to form a binder;

blending about 40 weight percent to about 80 weight percent of a low density additive into about 20 weight percent to less than about 60 weight percent of the binder to form a slurry;

pouring the slurry into a mold;

moving the mold to ensure distribution of the slurry;

curing the slurry to form the tile;

wherein the low density additive is effective such that a surface of the tile remains about 100° F. or less upon exposure to an energy source; and wherein the low density additive is a frothing agent to aerate the binder to form a predetermined volume of void space within the tile.

9. The method of claim 1, wherein the step of curing the slurry takes place over about 9 to about 12 hours.

10. The method of claim 1, further comprising adding about 1 weight percent or less of a zirconate coupling agent.

* * * * *